Figure 1:
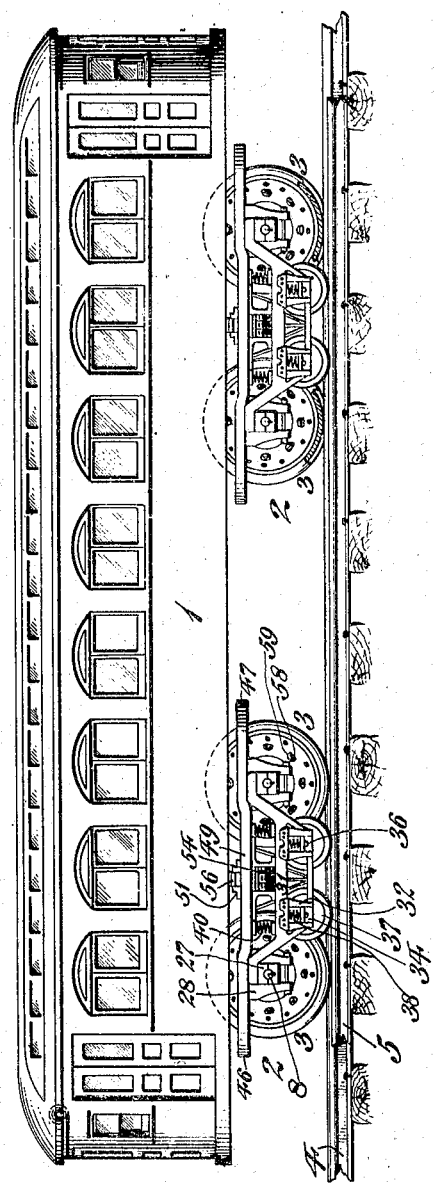

J. N. VANDEGRIFT.
MOTOR CYCLE RAILWAY SYSTEM.
APPLICATION FILED MAR. 9, 1905.

936,683.

Patented Oct. 12, 1909.
4 SHEETS—SHEET 1.

Witnesses
L. Douville,
P. F. Nagle.

Inventor
James N. Vandegrift
Biedersheim & Fairbanks.
Attorneys

J. N. VANDEGRIFT.
MOTOR CYCLE RAILWAY SYSTEM.
APPLICATION FILED MAR. 9, 1905.
936,683.
Patented Oct. 12, 1909.
4 SHEETS—SHEET 2.
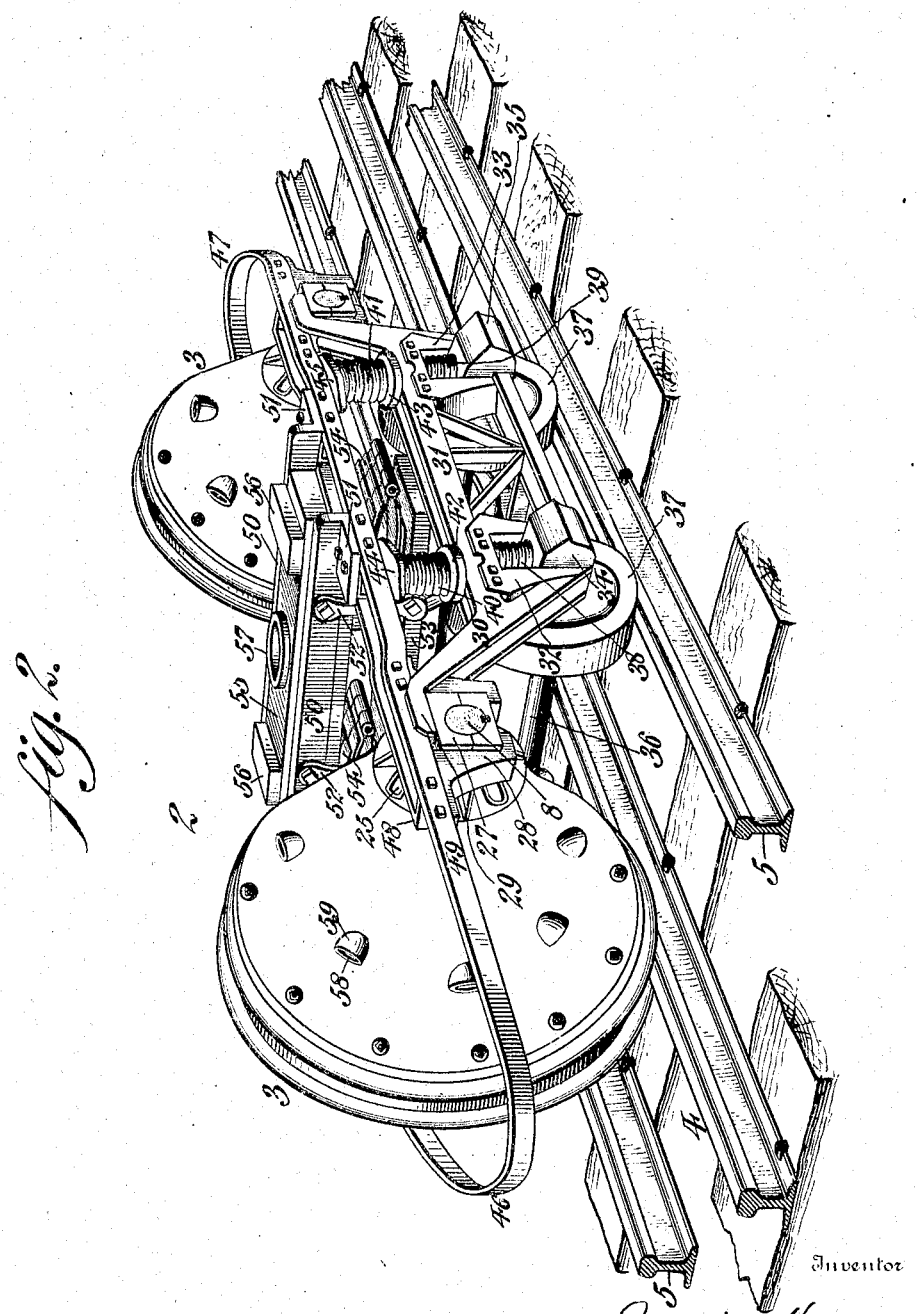

J. N. VANDEGRIFT.
MOTOR CYCLE RAILWAY SYSTEM.
APPLICATION FILED MAR. 9, 1905.
936,683.
Patented Oct. 12, 1909.
4 SHEETS—SHEET 3.
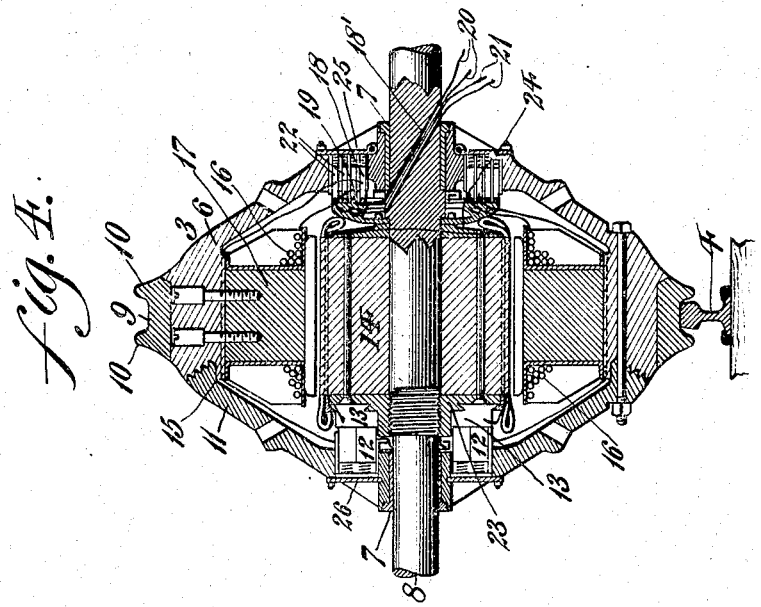
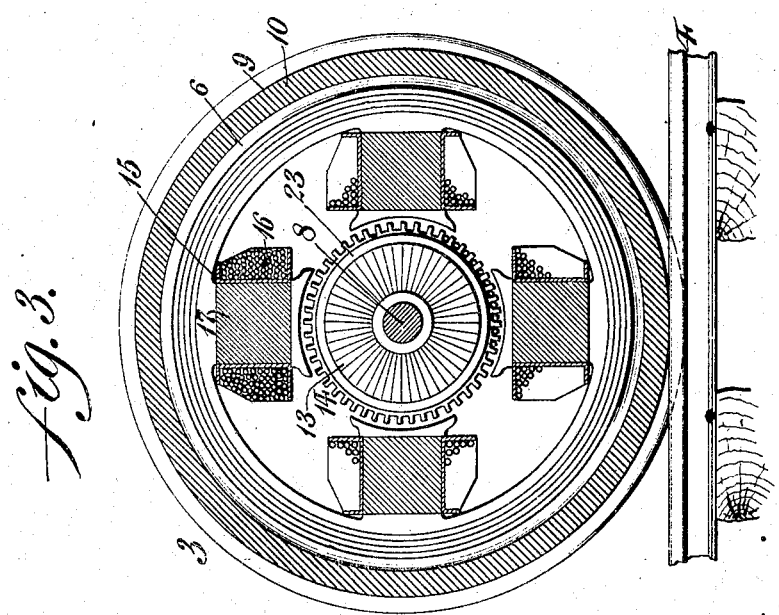

J. N. VANDEGRIFT.
MOTOR CYCLE RAILWAY SYSTEM.
APPLICATION FILED MAR. 9, 1905.

936,683.

Patented Oct. 12, 1909.
4 SHEETS—SHEET 4.

fig. 5.

Witnesses
L. Bouvillet
P. F. Nagle

Inventor
James N. Vandegrift
By Wiedersheim & Fairbanks
Attorneys

UNITED STATES PATENT OFFICE.

JAMES N. VANDEGRIFT, OF BRYN MAWR, PENNSYLVANIA.

MOTOR-CYCLE-RAILWAY SYSTEM.

936,683.

Specification of Letters Patent. Patented Oct. 12, 1909.

Application filed March 9, 1905. Serial No. 249,301.

*To all whom it may concern:*

Be it known that I, JAMES N. VANDEGRIFT, a citizen of the United States, residing at Bryn Mawr, in the county of Montgomery, State of Pennsylvania, have invented a new and useful Motor-Cycle-Railway System, of which the following is a specification.

The object of my invention is to produce efficient high speed car and train service.

A further object of my invention is to obtain safety and simplicity of mechanism.

A further object of my invention is to concentrate the weight of the car either singly or in trains upon central motor elements.

A further object of my invention is to approximate bicycle conditions in railway service.

A further object of my invention is to balance a central-bearing motor system.

A further object of my invention is to reduce the width of the motor elements so that they and the side bearing wheels may be used upon an ordinary railroad track, with the addition of a central rail only.

A further object of my invention is to bring the weight of the car upon the tandem, central, self-contained motor wheels.

A further object of my invention is to embrace the operative parts of my means of propulsion within centrally-disposed wheels bearing upon a single central rail.

My invention further consists of novel features of construction, all as will be hereinafter fully set forth.

Experiments in high speed service have demonstrated that railways comprising laterally-spaced rails and cars with eight or twelve supporting wheels with comparatively small weight on each wheel are unsuited for conditions of extremely high speed by reason of the impossibility of maintaining the both rails at a perfectly uniform surface, with a resultant lateral oscillation of car body and trucks to a degree both uncomfortable and unsafe. A maximum of safety, comfort and economy is obtained by adapting the bicycle principle to said railway conditions by which a maximum of traction and speed is obtained with a minimum of power as well as lateral oscillation of the car; the feature of the bicycle being the greater the speed the less the lateral oscillation. This is the reverse of existing railway conditions. In carrying out this idea I have provided a self-contained motor wheel which carries practically the entire weight of the car, and which is capable of being constructed, even in the large units necessary for railway work within sufficient lateral limits so that it may be used with side bearing steadying wheels upon the ordinary railroad track with the addition of a center rail upon either side of which center rail the flanges of the motor wheel travel.

Figure 1 represents a side elevation of a car provided with two of my new trucks. Fig. 2 represents a perspective view of a truck embodying my invention. Fig. 3 represents a vertical longitudinal section through the center of one of my motor wheels showing the armature and field but partially wound. Fig. 4 represents a vertical transverse section through the center of the shaft upon which my motor wheel is mounted showing the field coils but partially wound. Fig. 5 represents a vertical cross section through the center of the axle of a side bearing wheel and through a portion of the car.

Similar numerals of reference indicate corresponding parts in the figures.

The features of the car construction and of the truck and motor wheels not herein claimed are claimed in a copending application filed by me.

1 designates a car body having curved vestibules, in the form shown, mounted upon trucks 2—2. The truck wheels supporting the car consist of two motor wheels 3—3 arranged tandem to bear upon a center rail 4, which may be placed between the ordinary side rails 5—5 of existing railways. The motor wheels are composed of external rotatable field elements 6 mounted upon bearings 7 of fixed shafts 8 and carrying tread surfaces 9 shrunk on or otherwise secured thereto. These surfaces are provided with double flanges 10. One face 11 of the motor wheel is separable therefrom and carries with it the brushes 12 bearing upon the commutator 13 of the armature 14, which in this embodiment of my invention is fixed to the shaft.

Electric features which form no part of the present invention will not be set out in detail herein.

It will be evident that the armature might be external and rotatable about an internal field without departing from the spirit of my invention.

The field 6 carries pole pieces 15 upon which are wrapped windings 16 upon spools 17. The windings are arranged in series and are connected through brushes 18 and collector rings 19 with conductors 20 which pass through the shaft 8. The armature current passes in through the passage 18¹ in the shaft by conductors 21 to brushes 22 which current reaches the commutator 13 of the armature 14. This armature is built up of the usual laminated parts secured together by bolts passing through heads 23—24. Plates 25 and 26 permit access to the several sets of brushes.

The fixed axle about which the wheels revolve is secured in boxes 27 upon which the guides 28 move vertically with varying pressure and consequent different spring compressions. Upon the boxes 27 rests the horizontal projections 29 from the top of U-shaped side frame members 30 having a horizontal intermediate brace 31. At the lower corners, that is, the bends of the U, are located guides 32 and 33 which move vertically with respect to boxes 34 and 35 carrying the axles 36 of the spaced side wheels 37 adapted to rest upon correspondingly spaced rails 5—5 which may be of the ordinary track construction. These wheels are preferably without flanges. Between the boxes 34 and 35 and the horizontal brace 31 are located the spiral springs 38 and 39 by which the side wheels are normally pressed in contact with the rails. It will be evident that other forms of spring might be here used and that the springs thus placed will exert a steadying influence upon the motor elements and truck preventing excessive leaning of the car in rounding curves or when not in motion. Upon the top of the horizontal brace 31 I place springs 40 and 41, here shown as two in number, and spiral but which evidently may be of any desired number and of a different character of spring if required. These springs rest upon bases 42 and 43 and are terminated by caps 44 and 45 upon the top of which rests the upper frame work of my truck comprising preferably parabolic front and rear curved portions 46 and 47 united by intermediate double side frame members 48 and 49 which bear upon the caps of the springs. These top side frame members are united by transverse braces 50 having horizontally projected plates 51 by which the frame member and transverse braces are secured together.

Links 52 support the spring board 53 from these transverse braces. Upon this spring board are mounted preferably a plurality of elliptical springs 54 which support a beam 55 carrying near its extremity the bearing surfaces 56, against which the car body makes contact, and, at its center, king ring 57 within which the king bolt from the car rests.

The motors are cooled by means of apertures 58 in cupped projections 59.

It is evident that the motors are self contained and that they are therefore capable of being made in large units and yet narrow enough to lie between side frames of the character herein described whose outer wheels are adapted to rest upon the spaced rails of the ordinary existing railroad track. At the same time the freedom from external motor elements such as are sometimes placed upon the same axle as that of the motor wheel reduces air resistance, conduces to structural simplicity, permits the most direct possible application of power to a vehicle and relieves greatly from torsional strain.

The operation is as follows:—The car body rests upon the king ring and bearing surfaces of the transverse beam 55 and the weight is communicated to the spring board through the elliptical springs 6 and to the transverse braces by the links. These transverse braces transmit pressure to the upper side frame member which in turn bears upon the spiral springs resting on the intermediate horizontal braces 31. This brings the entire weight of the car upon the U-shaped side frame members which are supported upon the motor wheel shafts or axles. A small proportion of the weight of the car is taken up through the additional springs and the side bearing wheels 39. It will be evident that a maximum of tractive force is obtained inasmuch as a large part of the weight of the car equipment lies within the motor itself and the weight of the car is borne almost exclusively by these motors.

It will be evident that various changes may be made by those skilled in the art which will come within the scope of my invention, and I do not therefore desire to be limited in every instance to the exact construction herein shown and described.

Having thus described my invention, what I claim as new and desire to secure by Letters Patent, is:—

1. In a device of the character described, a transverse beam, a side truck frame, a plurality of springs in series between the beam and frame and a plurality of self-contained motors carrying the truck frame.

2. In a device of the character described, a plurality of self contained electrical motors the external rotatable members of which form bearing wheels arranged in tandem, in combination with side bearing wheels having bearing below the center of gravity of the system and having a bearing in substantially the same plane as the motor.

JAMES N. VANDEGRIFT.

Witnesses:
 WM. CANER WIEDERSEIM,
 C. D. McVAY.